United States Patent
Ostwald

(10) Patent No.: US 6,714,490 B2
(45) Date of Patent: Mar. 30, 2004

(54) CONCENTRIC RING CAROUSEL CONCEPT FOR DATA STORAGE LIBRARIES

(75) Inventor: Timothy C. Ostwald, Louisville, CO (US)

(73) Assignee: Storage Technology Corporation, Louisville, CO (US)

( * ) Notice: Subject to any disclaimer, the term of this patent is extended or adjusted under 35 U.S.C. 154(b) by 275 days.

(21) Appl. No.: 09/967,370

(22) Filed: Oct. 1, 2001

(65) Prior Publication Data
US 2003/0063527 A1 Apr. 3, 2003

(51) Int. Cl.⁷ .......................... G11B 21/08; G11B 7/085
(52) U.S. Cl. ...................................................... 369/30.5
(58) Field of Search ............................... 369/30.5, 30.4, 369/30.38, 30.33, 30.03, 30.01, 24.01, 30.56, 30.71, 30.79, 30.8, 30.86, 30.91, 179, 30.42, 30.41; 360/98.04, 98.06; 312/9.7, 9.46; 700/214, 218

(56) References Cited

U.S. PATENT DOCUMENTS

| | | | |
|---|---|---|---|
| 5,065,265 A | * 11/1991 | Pierrat | 360/92 |
| 5,541,897 A | 7/1996 | Baca et al. | 369/30.92 |
| 5,642,339 A | 6/1997 | Dang | 369/30.5 |

OTHER PUBLICATIONS

Bjorklund, H. S. et al, "Carrousel Random–Access Device", (IBM: Sep. 1972) v. 15, n. 4, pp. 1196–1197.*
http://www.adic.com/US/English/Products/Hardware/AIT/amle/index.html, Basic AML/E, Jan. 15, 2001, p. 2 of 4.

* cited by examiner

Primary Examiner—Julie Anne Watko
(74) Attorney, Agent, or Firm—Carstens, Yee & Cahoon, LLP

(57) ABSTRACT

A data storage system that uses multiple nested concentric carousels on a common rotating axis. Each carousel is equipped with an opening large enough to accommodate a retrieving arm, allowing the arm access to the next interior carousel. By aligning the openings of multiple carousels, the retrieving arm can access data storage cartridges located on any of the nested carousels.

19 Claims, 4 Drawing Sheets

CONCENTRIC RING CAROUSEL CONCEPT FOR DATA STORAGE LIBRARIES

BACKGROUND OF THE INVENTION

1. Technical Field

The present invention is directed generally toward storage systems for handling data storage cartridges. More specifically, the present invention is directed toward a carousel storage system for storing and accessing data cartridges.

2. Description of Related Art

Robotic media storage libraries are devices for providing automated access to a large collection of data stored on multiple physical storage media, such as magnetic tape cartridges or compact discs. Robotic media storage libraries generally contain a plurality of storage locations for physical media, one or more media drives for reading or writing physical media and a manipulator or "picker" for moving physical media from a storage location to a drive and back. Robotic media storage libraries may have special storage locations designated for certain purposes, such as serving as a temporary storage location while two pieces of media are being swapped or for adding or removing physical media from the library.

Library storage density is limited to the actual volume of the device used to store the physical data cartridges or discs. The storage capacity is further limited by the fact that the access device or retrieval arm must have a path to reach the desired individual storage cartridge.

Typical storage arrangements include multiple stacked carousels, which independently rotate about a central axis. An access device moves along a different axis to reach the different carousels, while the necessary carousel rotates to expose the desired data storage cartridge to the access device. Other typical storage libraries use a track and trolley combination, which carries cartridges from place to place, within the library.

Therefore, it would be advantageous to have an improved method and apparatus for storing and accessing cartridges in a library.

SUMMARY OF THE INVENTION

The present invention provides a carousel system for storing data, such as cartridges. In a preferred embodiment, multiple concentric storage ring carousels (also called storage drums) are located on a common axis of rotation. The multiple storage rings are preferably located in the same plane, so that inner rings are progressively nested within larger diameter outer rings. Outer rings are equipped with specially designed openings allowing access to inner rings when an outer ring is positioned properly with respect to the accessing arm or device. Positioning multiple outer carousels so that their access openings are aligned allows a retrieving arm access to any of the interior storage carousels.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
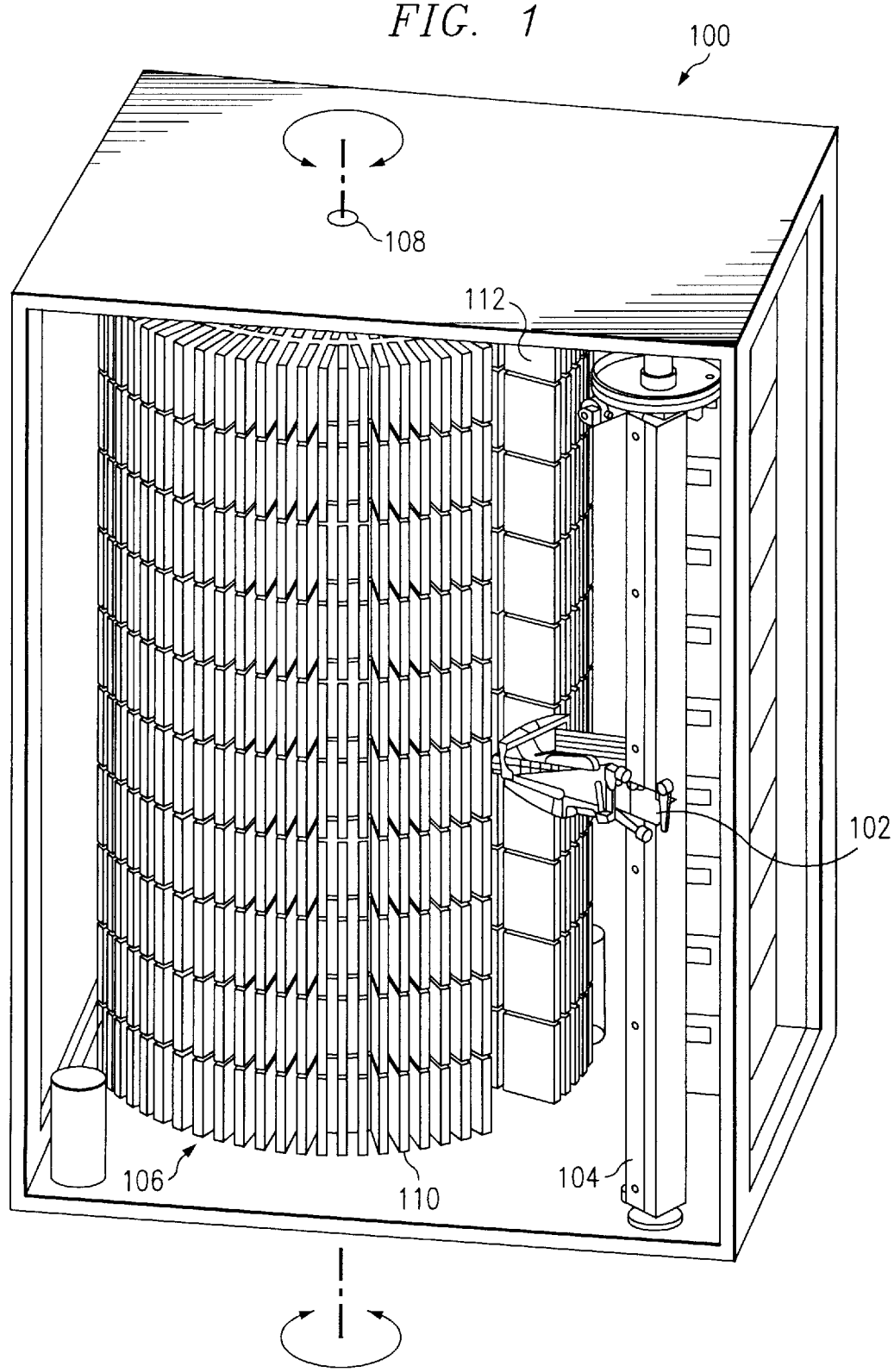
FIG. 1 shows a cutaway view of a data storage library according to a preferred embodiment of the present invention.

FIG. 1 shows a cutaway of a data cartridge library 100 according to a preferred embodiment of the present invention. As the figure shows, the storage capability of the library 100 is limited by the volume within its walls and the ability of access device 102 to reach individual storage cartridges. (It should be noted that the preferred embodiments described herein refer to cartridges as an example of a storage medium, but the present innovations are applicable to any other media as well, such as floppy discs, compact discs, or magnetic tape cartridges for example.) The access device 102 is moveable along an axis 104 such that it can reach along the length of cylindrical storage carousels 106 (sometimes referred to as storage drums). In this figure, only outermost storage carousel 106 is visible. Within this outer storage carousel 106 are located other similar storage carousels. In a preferred embodiment, all the storage carousels are concentric and rotatable around the same axis 108. The interior storage carousels are of decreasing radius such that they fit nested within one another and are free to rotate individually.

Storage carousel 106 is a cylindrical device, which has individual slots 110 for storing individual data storage devices such as discs or cartridges. By rotating the carousels 106 and moving the access device 102 along its axis 104, the access device 102 can reach any individual slot 110 in order to remove or replace an individual cartridge.

FIG. 1 also shows an access slot 112 located in the storage carousel 106. In a preferred embodiment, the access slot 112 is a section removed from the carousel 106 wide enough to move a data storage element through. The access slot 112 preferably runs the length of the storage carousel 106.

In less preferred embodiments, there are multiple access slots. Additionally, the carousels may be positioned vertically or horizontally.

Figure 2:
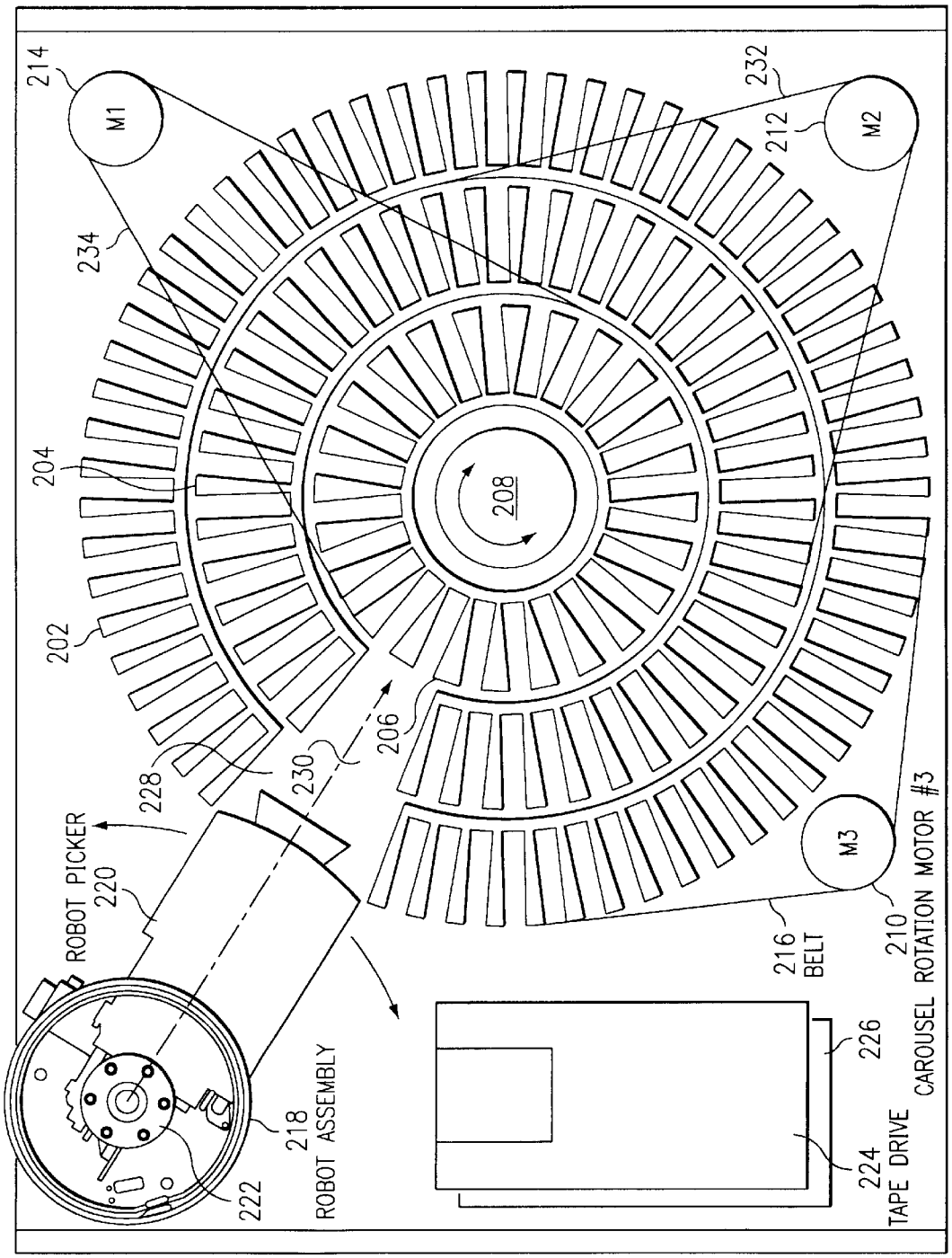
FIG. 2 shows an end view of the data storage in accordance with a preferred embodiment of the present invention.

FIG. 2 shows an end view of the data storage system. In this example, the library 100 contains three cylindrical storage carousels 202, 204, and 206. In a preferred embodiment, all the carousels are concentric, rotating about a common axis 208. Three carousel rotation motors 210, 212, and 214 are each connected to a respective carousel 202, 204, and 206 by belts 216, 232, and 234. Each motor 210, 212, and 214 can cause its respective carousel 202, 204, and 206 to rotate individually about the central axis 208. Though only three storage carousels are shown in this example, it should be noted that, according to the present invention, any number of carousels can be implemented in this way.

FIG. 2 also shows a robot assembly 218, which operates the access device 220, also called a robot picker, or access/ retrieval arm. The access device 220 is positioned on an axis 222 that runs parallel to the axis 208 of the storage carousels 202, 204, 206. The access device 220 is also moveable side to side so that removed individual storage cartridges or cassettes can be placed either in a tape drive 224 (or other drive, depending on the data storage medium) or in a temporary staging area 226. (In other embodiments, the staging area is located on the robotic retrieval device, or elsewhere in or outside the storage library).

Within each outer storage carousel 202, 204 is located an access slot 228, and 230. These access slots are wide enough for the access device 220 to pass through and reach interior carousels.

The innovative storage system increases storage capacity per volume by allowing the concentric nesting of the storage carousels. The carousels are preferably positioned so that they have substantial radial overlap, meaning the interior carousels are physically "inside" or nested within the outer carousels. In some embodiments, the ends of interior carousels may extend beyond this radial overlap to facilitate belts connected to carousel rotation motors, as shown in FIG. 3.

Figure 3:
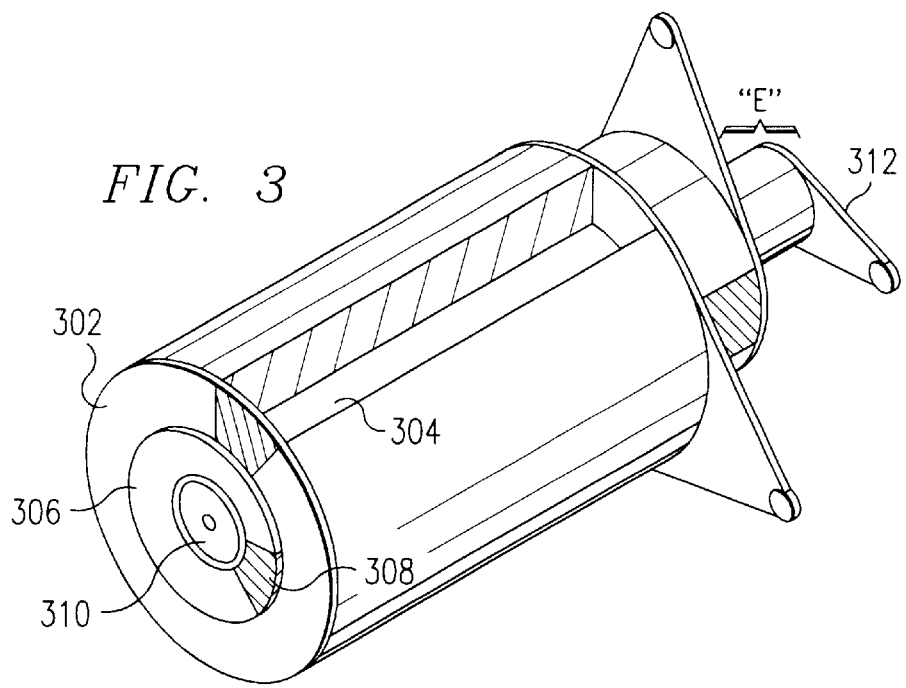
FIG. 3 shows a rough diagram of the storage drums in accordance with a preferred embodiment of the present invention.

FIG. 3 shows a rough diagram of the storage carousels. Outermost carousel 302 has an access slot 304. The middle storage carousel 306 has an access slot 308 that is not aligned with access slot 304. The innermost carousel 310 has no access slot in this embodiment. Storage carousel 310 is shown extending beyond the length of the two outer carousels 302 (outermost), 306 (middle), exposing section "E" beyond the radial overlap of the two outer carousels 302, 306. This extended section is used in this embodiment to attach belts 312 connected to a carousel rotation motor (motor not shown) for rotating the storage carousel 310. (Note that the length of section "E" is exaggerated in this figure to more clearly show the positions of the belts.) Of course this is only one possible means of rotating the necessary apparatus, and other means can be employed, such as a geared axis, which catches only the carousel, which is to be rotated, for example. Other means of independently rotating the carousels include a geared transmission with clutches, or a single motor with clutches, or a direct drive motor on an axis for each carousel.

Figure 4:
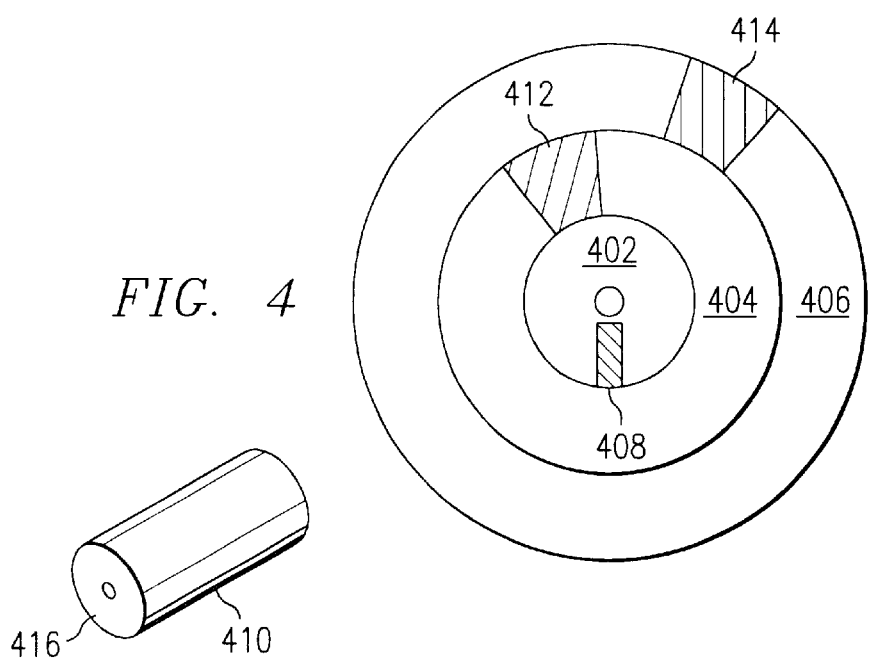
FIG. 4 shows the working of the innovative storage apparatus in accordance with a preferred embodiment of the present invention.
Figure 5:
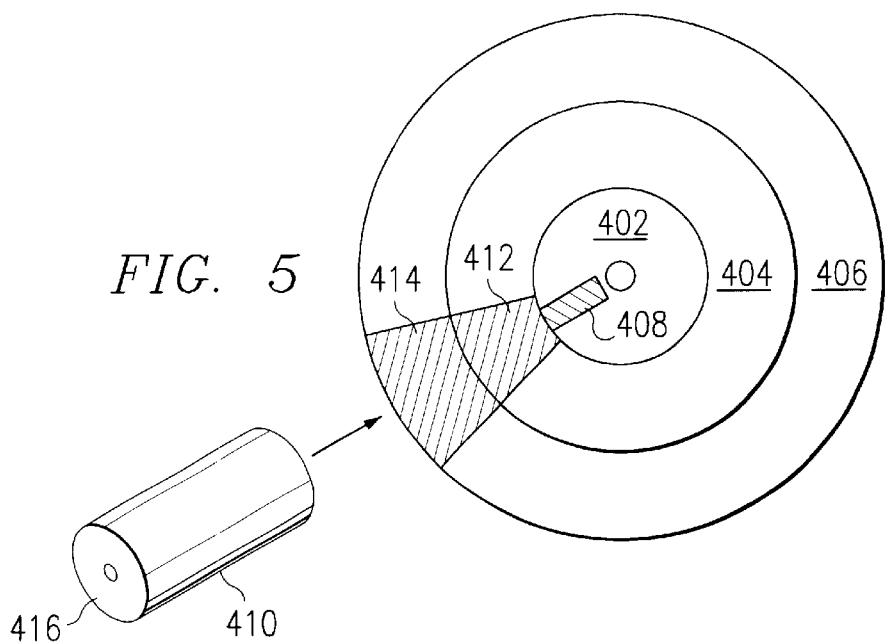
FIG. 5 shows the working of the innovative storage apparatus in accordance with a preferred embodiment of the present invention.

FIGS. 4 and 5 show one use of the innovative storage apparatus. FIG. 4 shows three concentric storage carousels 402, 404, and 406 seen end on. Innermost carousel 402 has in it the desired data storage cartridge 408, to be accessed by the accessing device 410. The accessing device 410 moves along axis 416. The accessing device 410 cannot access the cartridge 408 because storage carousels 404 and 406 block access. To access the cartridge 408, the outer two carousels 404, 406 must rotate so that their access slots 412, 414 expose the cartridge 408 to the accessing device 410.

FIG. 5 shows the same system after properly aligning access slots 412, 414, and cartridge 408. As shown, the access slots of the two carousels are now aligned with accessing device 410 allowing it to extend and reach cartridge 408 (which also rotated to be in proper accessing position). In this way, any cartridge on any of the storage carousels can be accessed.

Figure 6:
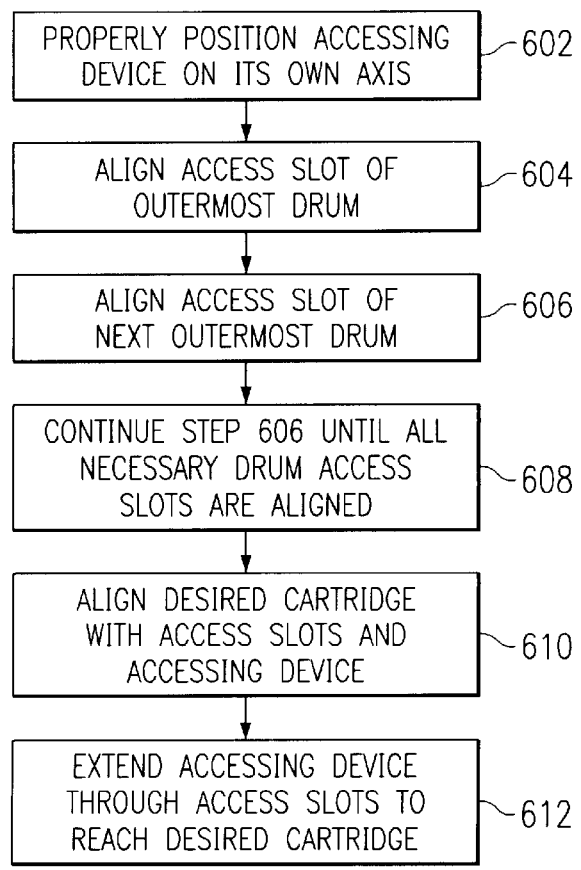
FIG. 6 shows a flowchart of an example method for using the storage apparatus in accordance with a preferred embodiment of the present invention.

FIG. 6 shows a flowchart of an example method of using the storage apparatus, in reference to FIGS. 4 and 5. In this example, the desired cartridge is located on the innermost storage carousel 402. First, the accessing device moves along its axis 416 to be positioned adjacent to the row with the desired cartridge (step 602). The outermost carousel then rotates so that its access slot is aligned with the accessing device (step 604). The next outermost carousel then rotates in a similar fashion, aligning itself with the accessing device, and exposing the next outermost storage carousel (step 606). This proceeds until all carousels, which are located outside the carousel with the desired cartridge, have rotated so that their access slots are aligned with the accessing device (step 608). After these carousels are aligned, the carousel with the desired cartridge rotates aligning the cartridge with the access slots and the accessing device (step 610). The accessing arm then extends in through the open access slots to reach the desired cartridge (step 612). Using this or a similar process, any cartridge on any carousel can be accessed.

The present innovations allow a maximum of storage density in a minimum volume. Normally unused space (such as that within a storage drum) is used to store cartridges without the need for complex track and trolley systems. Of course, the exemplary embodiments described herein are not the only possible implementations of the present innovations. Other implementations are possible, for example, placing a retrieval device inside a ring of similar carousels and accessing them from the inside rather than from the outside. Though this is a less preferred embodiment, it helps to show the possible variation within the contemplation of the present innovations.

The description of the present invention has been presented for purposes of illustration and description, but is not intended to be exhaustive or limited to the invention in the form disclosed. Many modifications and variations will be apparent to those of ordinary skill in the art. Although the depicted examples are described with respect to cartridges, the present invention may also be applied to other types of storage media, such as for example floppy discs or compact discs. The embodiment was chosen and described in order to best explain the principles of the invention, the practical application, and to enable others of ordinary skill in the art to understand the invention for various embodiments with various modifications as are suited to the particular use contemplated.

What is claimed is:

1. A storage system, comprising:
   first and second concentric storage carousels positioned on an axis, the storage carousels being separately rotatable and at least partially radially aligned, wherein the first storage carousel has a greater outer radius than the second storage carousel such that the second storage carousel sits within the first storage carousel;
   wherein the first storage carousel has an access opening allowing access to the second storage carrousel by an access arm.

2. The storage system of claim 1, wherein a receptacle within the second storage carousel is accessed through the access opening by rotating at least one of the first storage carousel and the second carousel such that the receptacle is aligned with the access opening.

3. The storage system of claim 2, wherein the receptacle is configured to receive a data storage element.

4. The storage system of claim 3, wherein the data storage element includes at least one of magnetic tape cartridges, floppy discs, and compact discs.

5. A storage system, comprising:
   a plurality of rotatable concentric cylindrical storage carousels including a first storage carousel and a second storage carousel positioned on a first axis, wherein the first storage carousel has a greater outer radius than the second storage carousel and the second storage carousel is located within the first storage carousel; and a retrieval arm positioned on a second axis, the second axis parallel to the first axis;

wherein the first storage carousel has an access slot which extends parallel to the first axis, the access slot allowing the retrieval arm to access the second storage carousel.

6. The storage system of claim 5, wherein a receptacle within the second storage carousel is accessed through the access slot by rotating at least one of the first storage carousel and the second storage carousel such that the receptacle is aligned with the access slot.

7. A storage system, comprising:

a plurality of rotatable concentric cylindrical storage carousels positioned on a first axis; and a retrieval arm positioned on a second axis, the second axis parallel to the first axis;

wherein a first access slot and a second access slot located in the first storage carousel each extend parallel to the first axis, the first and second access slots allowing the retrieval arm to access the second carousel located within the first carousel.

8. The storage system of claim 6, wherein the receptacle is configured to receive units of data storage media.

9. A data storage system, comprising:

a first axis having a first storage carousel rotatably positioned thereon;

a second storage carousel rotatably positioned on the first axis and having a greater radius than the first storage carousel so that the first storage carousel sits within the second storage carousel; and an access arm moveable along a second axis, the second axis parallel to the first axis;

wherein the second storage carousel has an access opening therein, the access opening extending substantially the length of the storage carousel parallel to the first axis;

whereby when the access opening is aligned with the access arm, the access arm can reach past the second carousel to reach the first carousel.

10. The system of claim 9, wherein a receptacle in the first storage carousel is accessed through the access opening by rotating at least one of the first storage carousel and the second storage carousel such that the access opening is aligned with the receptacle.

11. The system of claim 10, wherein the receptacle is configured to receive units of storage media.

12. The system of claim 11, wherein the storage media include at least one of magnetic tape cartridges, floppy discs, and compact discs.

13. A data storage apparatus, comprising:

a first storage ring rotatable around an axis, wherein the first storage ring has a first plurality of receptacles; and a second storage ring rotatable around the axis, wherein the second storage ring has a second plurality of receptacles and has an access opening, wherein the second storage ring has an outer radius greater than an outer radius of the first storage ring and wherein the first storage ring is nested within the second ring and wherein access by an access arm to all receptacles within the first plurality of receptacles in the first storage ring occurs through the access opening.

14. The data storage apparatus of claim 13, wherein a receptacle within the first plurality of receptacles is accessed through the access opening by rotating at least one of the first storage ring and the second storage ring such that the receptacle is aligned with the access opening.

15. The data storage apparatus of claim 14 wherein the first plurality of receptacles and the second plurality of receptacles are configured to receive units of storage media.

16. The data storage apparatus of claim 15, wherein the storage media includes at least one of magnetic tape cartridges, floppy discs, and compact discs.

17. A method for storing and accessing cartridges, comprising the steps of:

positioning cartridges on a first carousel, the carousel being rotatable about a first axis;

positioning cartridges on a second carousel, the second carousel having an access slot therein, the second carousel being rotatable about the first axis and concentric with the first carousel, the second carousel having a larger diameter than the first carousel and being at least partially radially aligned therewith;

rotating the second carousel so that the access slot aligns with a cartridge access device, the cartridge access device being moveable on a second axis parallel to the first axis and being extensible to reach the first and the second carousels;

rotating the first carousel so that a first cartridge is aligned with the access slot and the cartridge access device;

inserting the cartridge access device through the access slot to reach the first cartridge on the first carousel.

18. The method of claim 17, wherein the first cartridge comprises a unit of data storage media.

19. The method of claim 18, wherein the storage media includes at least one of magnetic tape cartridges, floppy discs, and compact discs.

* * * * *